United States Patent [19]

Moore et al.

[11] 4,424,418
[45] Jan. 3, 1984

[54] COMMUNICATION SYSTEM PARKHOLD CONFERENCING

[75] Inventors: George E. Moore, Tinton Falls; Vincent A. Muehter, Towaco, both of N.J.

[73] Assignee: Bell Telephone Laboratories, Incorporated, Murray Hill, N.J.

[21] Appl. No.: 264,569

[22] Filed: May 18, 1981

[51] Int. Cl.³ .............................................. H04M 3/56
[52] U.S. Cl. .............................................. 179/18 BC
[58] Field of Search ............ 179/18 BC, 18 BF, 18 B; 370/62

[56] References Cited

U.S. PATENT DOCUMENTS

| | | | |
|---|---|---|---|
| 3,627,955 | 12/1971 | Stone, Jr. | 179/18 BF |
| 3,676,603 | 7/1972 | Budrys et al. | 179/18 BF |
| 4,022,983 | 5/1977 | Braun et al. | 179/18 B |
| 4,232,198 | 11/1980 | Warman | 179/18 BC |
| 4,317,960 | 3/1982 | Johnson et al. | 179/18 BC |

FOREIGN PATENT DOCUMENTS 2838223  3/1980  Fed. Rep. of Germany ... 179/18 BC

Primary Examiner—Thomas W. Brown
Attorney, Agent, or Firm—David H. Tannenbaum

[57] ABSTRACT

A communication system is arranged having a special hold mode (called parkhold) where a station may place any conference connection associated with that station in the parkhold mode. Any station in the system may, by transmitting a certain signal, become connected to any parked conference without regard to whether that staton has an appearance of the parked line. Selectivity is provided in that each conference is parked on a separate link and the recall signal identifies the link of any particular parked conference. This arrangement can be used for call transfer, meet-me-conferencing as well as for allowing mobility between stations in retrieving a call from the parkhold mode.

10 Claims, 12 Drawing Figures

ADDING A STATION TO A LINK PARK PICK-UP

UPDATE PARKING STATION'S RECORD
PARK PICK-UP

REMOVAL OF PARKING STATION PARK PICK-UP 4,424,418

COMMUNICATION SYSTEM PARKHOLD CONFERENCING

BACKGROUND OF THE INVENTION

This invention is directed toward an improved call conferencing system for use in an electronic communication system and more particularly to an arrangement for permitting any station within the system access to an existing conference under the control of a conferee.

A problem exists in telephone communication systems when it is desired to establish conferences between more than two stations and the whereabouts of the party associated with the additional station is unknown. Primarily this problem arises from the desire to allow any system station access to the conference under control of a conferee.

In some presently known systems the station user (conferee) would flash the switchhook to obtain operator assistance when a conference involving more than two stations is desired. The operator would then locate the desired party and connect that person to the conference. This method presents a problem when the called party must be paged as the operator must wait for a return call before establishing the conference. This procedure is clearly inefficient and time consuming.

In other known systems, conferences involving more than two stations can be established under the control of one of the conference parties by first flashing the switchhook, obtaining dial tone, dialing the desired number, and then again flashing the switchhook to bridge the two call connections. This presents a problem if the desired party is not at the called number since the connection is made even though the called party may not be aware of that fact. Furthermore, even if the desired party is then paged, there exists no method which can be invoked to allow that party to join the conference.

There do exist, however, cumbersome systems in which one party in a two party connection can remove the other party from the connection by flashing the switchhook, obtaining recall dial tone, dialing a special access code, receiving a second dial tone, dialing a special zone number, receiving a third dial tone, and finally dialing a channel number to transfer the other party to a vacant port. Once this has occurred, any station may pick up the call by dialing an answer back access code, receiving dial tone, then dialing the correct channel number to establish a two party connection to the transferred party. This feature is called call park and, in addition to being cumbersome, inefficient, and time consuming, it is not available for conference purposes.

SUMMARY OF THE INVENTION

This invention solves this problem by permitting a station active in a conference to place the conference on hold by either a switchhook flash or button push, and then, by using a system access button, dialing a code to place the conference in the special parkhold state. When the conference is in the parkhold state, dial tone is returned to the parking party who may then call or page the desired add-on party. The paging party may then rejoin the conference and the paged party may join the conference at any time by dialing the proper conference park pick-up code. This feature is called flexible conferencing and allows for easy additions to existing conferences by parties at locations unknown to the conferees.

BRIEF DESCRIPTION OF THE DRAWINGS

The solution to the foregoing problems, together with the operation and utilization of the present invention, will be more apparent from the following description taken in conjunction with the drawing, in which.

GENERAL DESCRIPTION—BACKGROUND

Before beginning a discussion of the specific features claimed, it may be helpful to review in general terms the operation of an overall system in which these claimed features can be utilized. It should be borne in mind that the features can be used in any number of similar type systems and thus only background information on one type of system will be presented. In addition, since communication system features may be used with different types of systems each dependent on different hardware constraints and upon different programming techniques, no attempt will be made to detail the entire program used to control the overall system, as such would cloud the issue and unnecessarily lengthen this specification. Quantities mentioned were engineered for particular time and memory requirements and will not be the optimum for all such systems.

It will, of course, be obvious to one skilled in the art that in order for the features described and claimed herein to be used with any communication system, the features must be blended into the overall structure of the system in which they are used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the features may be used. The patent specification will provide the logical steps necessary for the implementation and blending of the described features into such a larger system, having many other features.

TYPICAL OVERALL SYSTEM OPERATION

Figure 1:
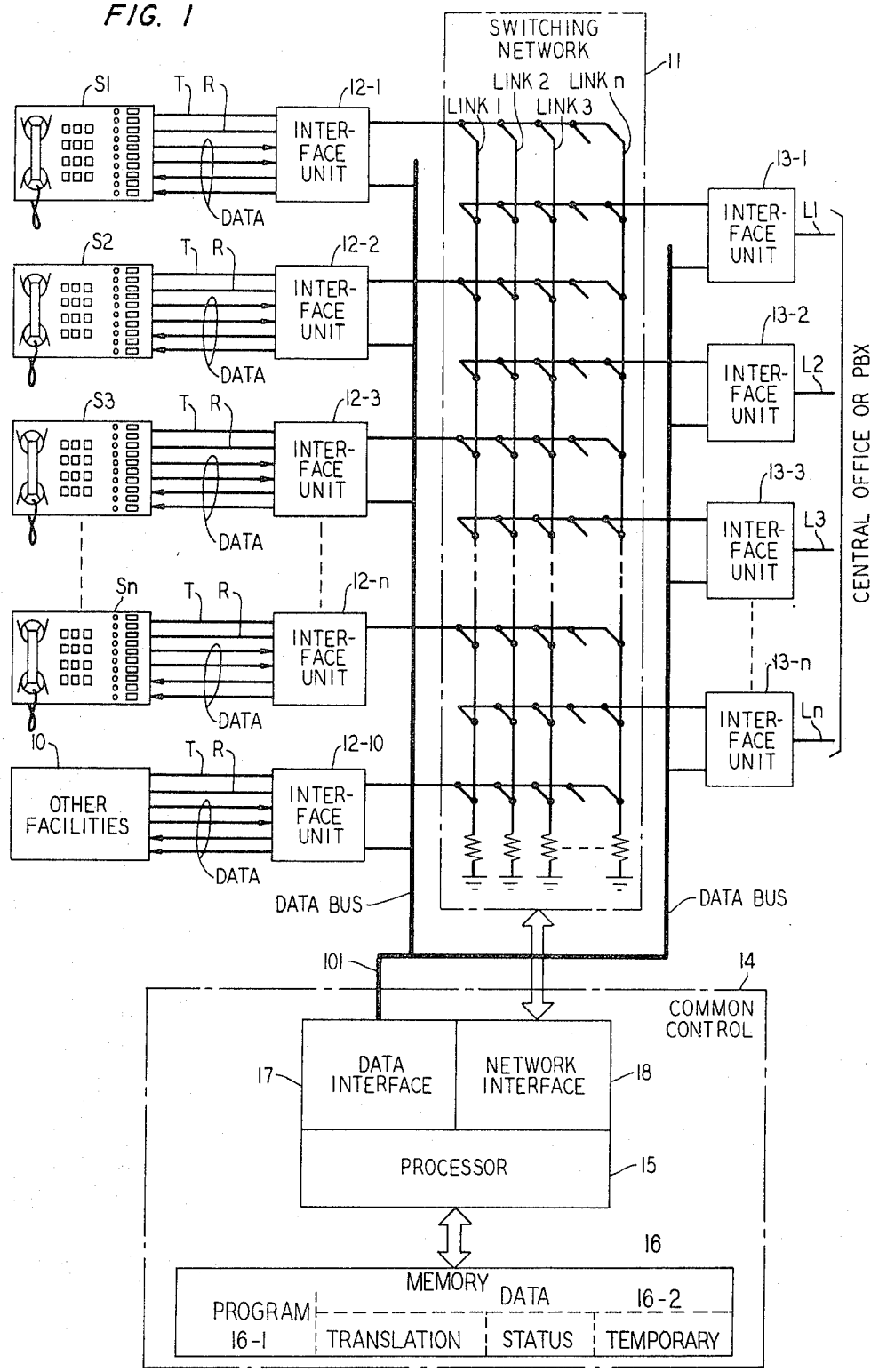
FIG. 1 shows an overall system configuration having several multibutton electronic telephone (MET) stations.

One such communication system where the structure claimed herein can be used is a station oriented, solid-state, stored program control, business communication system. FIG. 1 shows a block diagram of such a system which combines the usual key system features (hold, visual indication, etc.) with many new features not previously available.

Call processing in the system is under the control of a microprocessor 15 in common control 14. Each station such as station S1, and line port, such as 13-1, is scanned to detect any changes in status. In response to any change (e.g., on-hook, button depression, etc.), the processor, per instructions in the stored program in memory 16 translates these changes into system commands. The system also generates commands via a bidirectional data bus to the multibutton electronic telephone (MET) set, which is shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls. The system also controls non-key sets which offer less expensive (and less powerful) station position alternatives.

In the MET set implementation the first (lower) four buttons on each MET station set are always the same. They are: Hold, ±, and two System Access buttons, each associated with the intercom number of the particular station. The ± feature is described in U.S. Pat. No. 4,150,259 dated Apr. 17, 1979, hereby incorporated by reference. The System Access buttons are used to receive calls from other stations within the communication system (intercom) and to originate such calls or to access system facilities such as lines, paging ports, etc. Incoming calls may terminate on either System Access button depending on their busy-idle status. If the lower one is busy, a second incoming call comes to the second (upper) one, giving a visual call waiting indication, accompanied by a single audible ring if the station is off-hook. The System Access buttons are also used in conferencing and call transfer features, as described in U.S. Pat. No. 4,125,748 dated Nov. 14, 1978, hereby incorporated by reference. The remainder of the buttons on the MET station sets are flexible buttons and can be assigned to any of the button-activated features.

As shown in FIG. 1 there are three pairs of wires coming out of the MET set to the interface unit: T and R, data in, data out. The T and R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly.

Common control 14 consists of processor 15, inferface units 17 and 18 and memory 16. The memory unit consists of a program store 16-1, and a data store 16-2. The data store is subdivided into the following:

A. Translation which contains the hardware configuration data. For example, the button assignments and station class of service.
B. Status which stores the state of the system at a given moment. For the station, it contains
  (a) station state: switchhook; ± operation; whether actively connected to the network or not,
  (b) button state: for each button
    (i) if the red I-Use LED is on
    (ii) what is the green status LED state
    (iii) which link is associated with the call on this button.
C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets a flag and returns to the interrupted task which, in turn, will relinquish control to TSK-DSP control, as soon as it reaches a convenient break point. The task dispenser decides which task is to be executed next according to a schedule. Basically, these tasks fall into three categories:

(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 MS cycle, the system will perform routine maintenance functions until the next work cycle begins.

The following features can be implemented by the system discussed herein.

I-Use Indication

Figure 2:
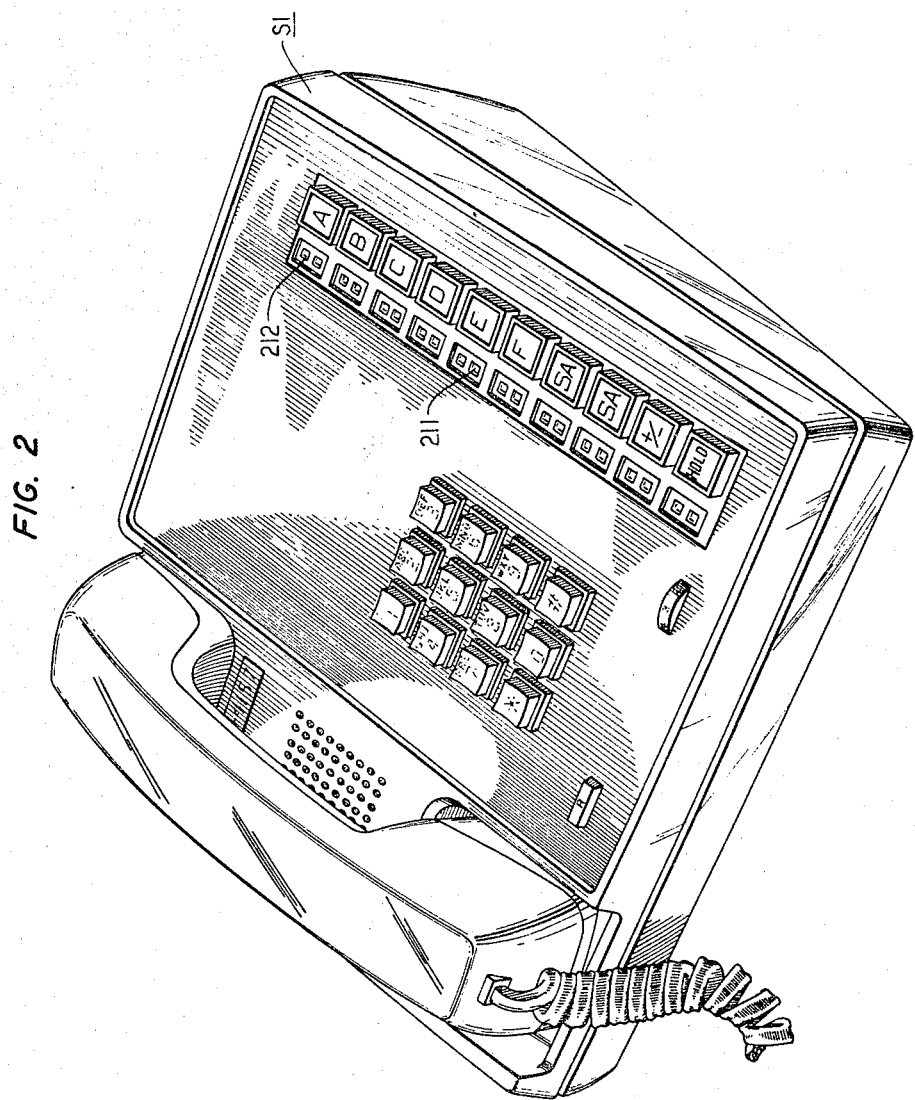
FIG. 2 is a pictorial representation of a MET station set.

This feature provides a red I-Use LED, such as LED 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

Line Status Indication

Call status indications are given by means of a green status LED, such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

Station-to-Station Calling

This feature allows a station user to directly dial other stations within the system without the assistance of the attendant. This is accomplished by selecting on idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set. The switching network and line circuits shown in FIG. 1 can be of the type shown in U.S. Pat. Nos. 3,991,279 and 3,991,280, both issued Nov. 9, 1976, and in U.S. Pat. No. 4,110,566 of J. J. Shanley, dated Aug. 29, 1978.

Operational Example of Conference Parking

With reference to FIG. 2, assume that Station S1 is active on an SA (system access) button with an existing conference. The red IUSE LED will indicate that the station has depressed this button; while, the green status LED will indicate that station S1 is busy.

The station user wishes to bring in an additional party to the conference. The user depresses the hold button which extinguishes the IUSE indicator and sends the status LED to the flashing or hold state. By depressing the remaining SA key, the user receives dial tone. The user then dials the Conference Parking Code and receives recall dial tone. The recall dial tone is used to access a paging port. The calling party then informs the desired called party to join the conference; and the calling party returns to the conference by depressing the SA key opposite the status LED indicating the held state.

The paged party may go to any station within the system to dial the park pick-up code to become connected to the conference.

Detailed Description—General

In the status memory (FIG. 1, element 1b) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button I-Use (SBI) for the I-Use LED.

Also, for each station set, there is a status memory location for recording:

(c) the last detected instantaneous state of the station's switchhook and buttons (d) the desired state of the station's tone ringer (on/off, volume setting, frequency setting).

Periodically, the processor (FIG. 1, element 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, element 17). The MET returns to the processor, via the data interface, the instantaneous state of its switchhook and buttons.

The returned data is compared with that in (c) above and any changes are recorded in a temporary buffer for that station. At a subsequent time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical form, e.g., a value of 1 identifies a call coverage button, a value of 2 identifies an automatic intercom button, et cetera.

For a speech-type button (e.g., system access, autointercom, personal line, pooled line, call coverage, et cetera), there are four possible states which will be shown to the user on the status LEDs: namely, busy—(LED steady on), idle—(LED dark), ring—(LED flash), hold—(LED wink).

This information is stored in the status data memory (16-2 in FIG. 1) coded in numerical forms. For a non-speech-type button like message-waiting, the same data format is used although the valid states may reduce to two (busy and idle).

As described early, the scan routines in the system detect and report a button push by the MET user to a buffered area to wait for the process routines to process. When such a change is processed by the process routines the button identification information, SBID, stored in 16-2 is first checked, then the button status information, SBS, stored in 16-2 is checked. The processor is then able to interpret the button push to a specific user command and uses the proper programs stored in 16-1 to process the change. For example, button selection of an idle (from SBS) speech-type (from SBID) button implies call origination requiring the associated facilities, a ringing (from SBS) speech-type (from SBID) button implies answer a ringing call.

Detailed Description—Conference Park

The following discussion is made with reference to FIGS. 3, 4, 5 and 6 and shows the operation necessary to realize the claimed flexible conferencing feature.

A person may reserve a place on a call or conference by placing the link on hold. Records are maintained to associate the link data with a station, and thus it is possible for the station user to rearrange this link and the station records so that any other station may bridge-on to the same link, thereby joining the conference.

Figure 3:
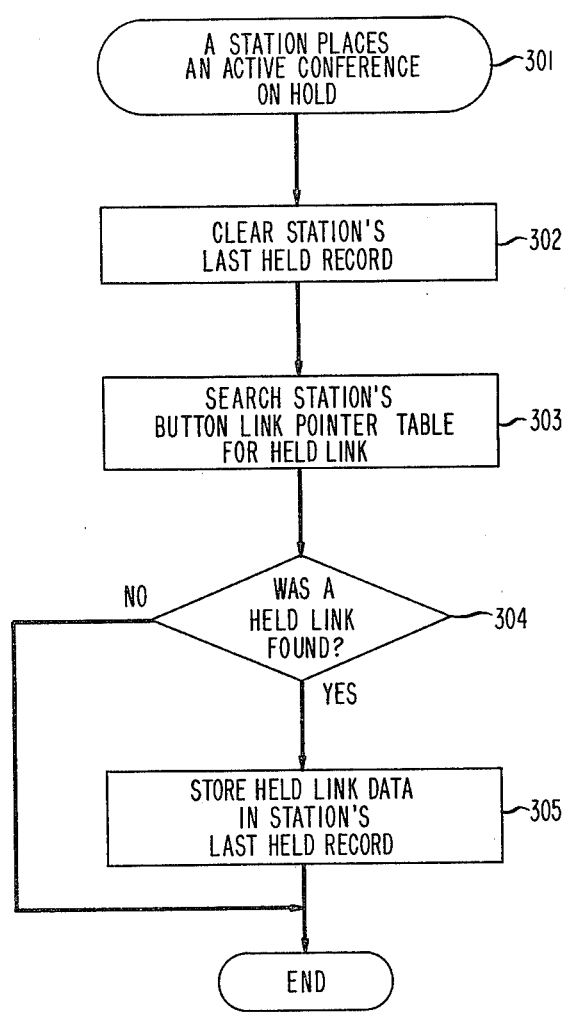
FIG. 3 is a flow chart showing steps used in tracking each station's hold request of an active conference.
Figure 4:
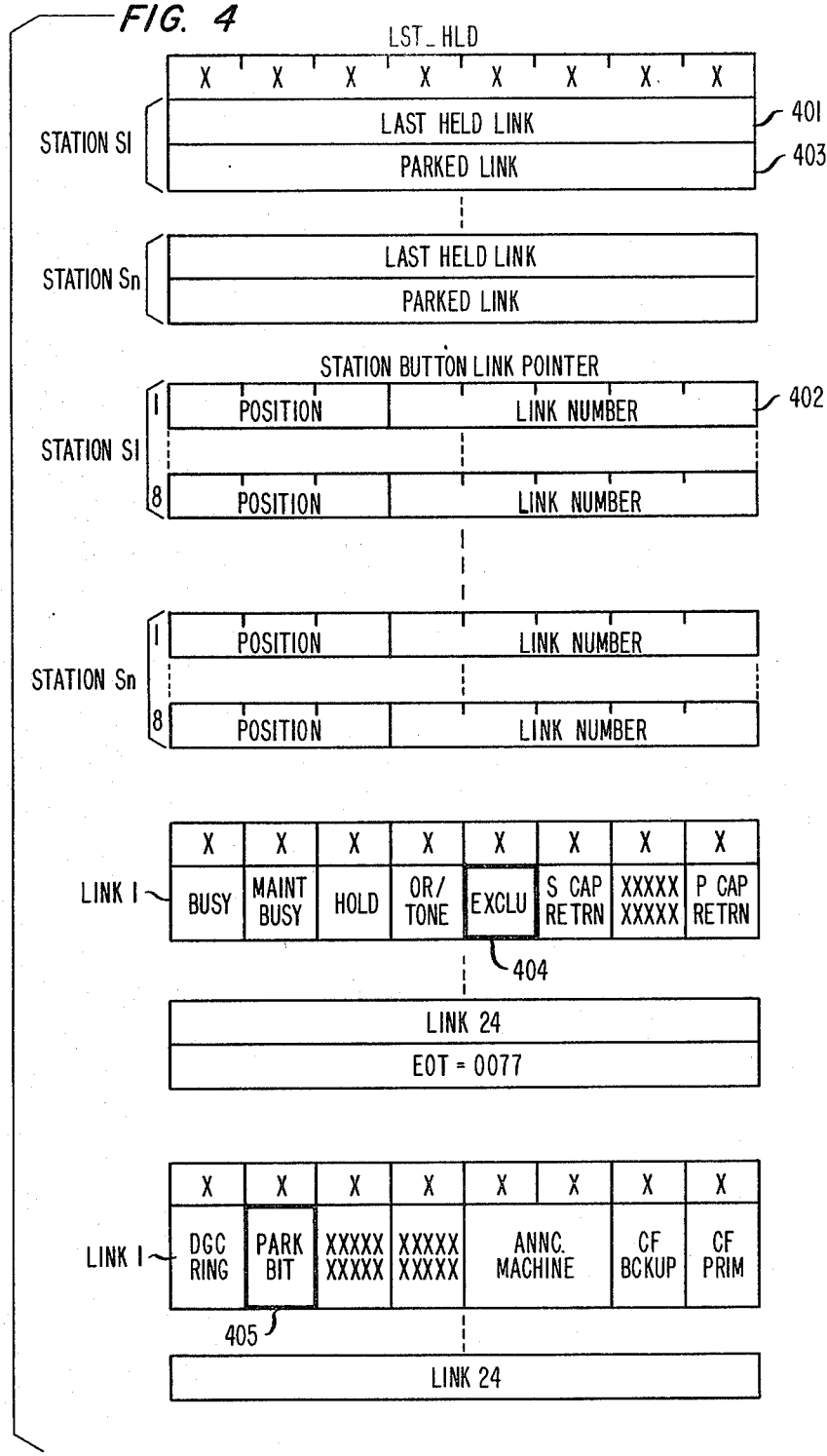
FIG. 4 shows some of the data structures used in processing the hold request.

The parkhold software modules 301–305, FIG. 3, maintain records of the last link held by a station. When a station places an active call on "hold", the last active button data is stored in the last held record of the call park table. As shown in FIG. 4, the data saved in list 401 anticipates possible call park requests, and thus each station's last held record is kept current while that station is active on a call. This task is cleared when the station terminates call activity. A hold is accomplished by setting the hold bit in the link state information table. The periodic actions of the processor previously described will automatically result in the link being held. The parkhold software must then update the station's last held record. A description of this software follows.

Station entries will be kept current if the parkhold software determines for each hold request that the station has a button(s) that points to the held link. To accomplish this, the software must find a link number, in the station's button link pointer table 402, that is the same as the held link number. If the desired link number is found, the parkhold software must address the station's last held record, in list 401, and store the link pointer in list 402, in the station's last held record, list 401.

Figure 5:
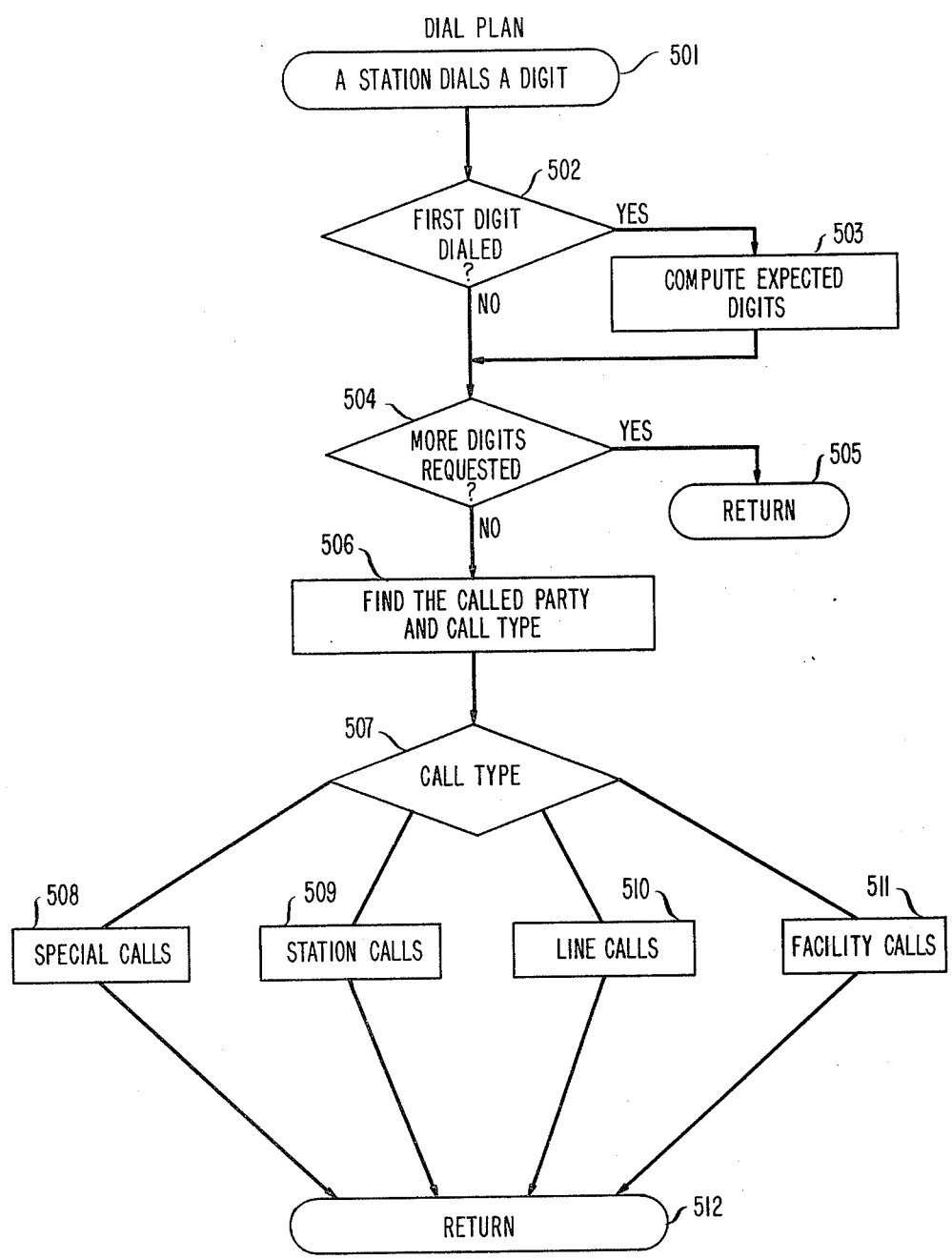
FIG. 5 is a flow chart of the dial plan.
Figure 6:
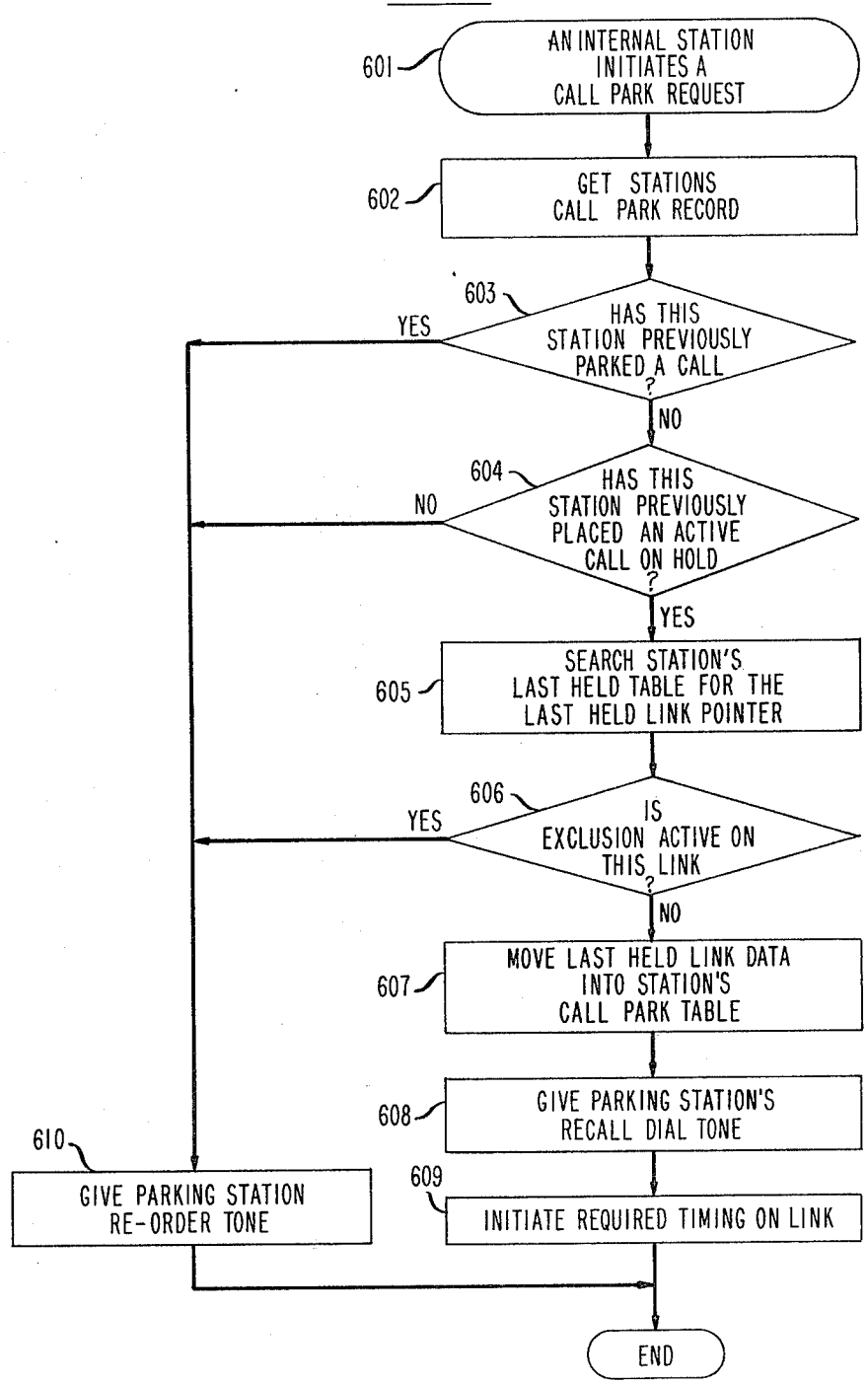
FIG. 6 is a flow chart showing the steps used to place a call or conference in the parkhold state.
Figure 7:
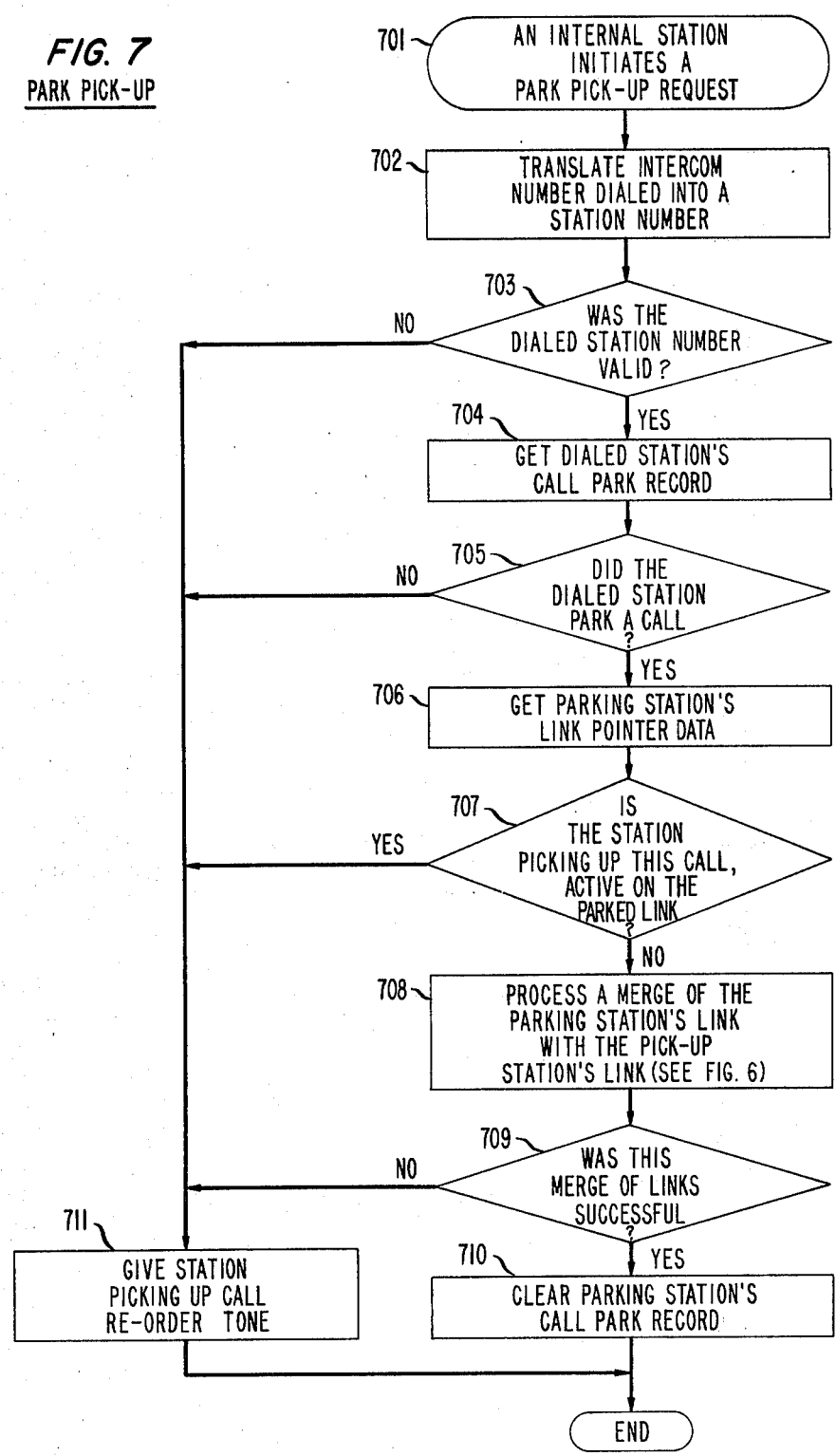
FIG. 7 is a flow chart showing the overall steps used to pick up a parked call.

The dial plan software, FIG. 5, blocks 501–512 establishes specific codes which must be used to access the call park software FIG. 6, blocks 601–610 or the park pick-up software FIG. 7, blocks 701–711. These modules are used to process the call park and park pick-up dialed stimulus.

As shown in FIG. 5, when a station user dials any sequence of digits, the dial plan software performs two operations on the received digits: (1) it determines the type of call origination 506 and (2) it directs the processing based on the type of call 507–512.

The software in block 506 determines the type of call based on the first digit dialed. When the first signal dialed is the "star-*" service character, the call is considered by the system to be of a special type and the caller may be required to dial from one to five more digits before the software will process the request.

The software in block 506 uses the first and second received digits to determine that the dial sequence corresponds to either a call park request or a park pick-up request.

The software in block 508 passes control to the appropriate routine for handling the specific call type. In the case of "*5", control is passed to CALL PK, FIG. 6, while control is passed to PARK PU, FIG. 7, only if the "*8" sequence is followed by two intercom digits.

The call park software module, FIG. 6—blocks 601–610 is responsible for processing calls whose first two dialing signals are "star", *5.

The software must: (1) validate each station's call park request, blocks 601–606, (2) process valid park requests, blocks 607–609, (3) and process invalid park requests, blocks 610.

A station's call park request is considered valid when: (1) the station has no previously parked calls in its call park record, block 403, (2) the station has a call on hold, block 401, and (3) the held link associated with this station does not have the exclusion feature active, block 404. By examining the station's last held record, block 401, and its call park record, block 403, the software can determine that there is/is not a call currently parked or held. An examination of the link state table, block 404, determines the exclusion status of the link.

Based on these findings, the call park software determines that the station's request is valid or invalid.

As shown in FIG. 6, the call park module uses the software in blocks 607–609 to process valid park requests. This software is responsible for: (1) determining the type of station initiating the park request, (2) securing the required facilities for call park origination for an EMT station (Touch-Tone Electromechanical Telephone) and (3) securing the required facilities for call park origination for a MET station. A successful park is followed by an updating of the link state information records, block 405. The link's table must indicate: the parkhold state and link timing activity.

The call park software gives a station invalid call treatment if: (1) the station has a previously parked call, block 603, (2) the station does not have a call on hold, block 604, or (3) the link in question has exclusion active, block 606. Invalid call park processing results in the parking station receiving reorder tone, block 610.

The park pick-up software, FIGS. 7, 8, 9, 10, 11, 12, connects the calling station to the appropriate parked link. It is activated when a station user dials the *8XX code. The "XX" corresponds to the intercom number of the station that originally parked the call.

Three tasks must be accomplished by the park pick-up software: (1) translation of dialed intercom numbers into a station's internal number, block 702, (2) processing invalid park pick-up requests, blocks 703–707, 711, and (3) processing valid park pick-up requests, blocks 708–710.

The software in block 702 uses the origination register to determine the intercom number dialed. This register stores each digit that the station dials, including the dialed intercom number. The system then uses the intercom number dialed to determine if the number is acceptable.

Figure 8:
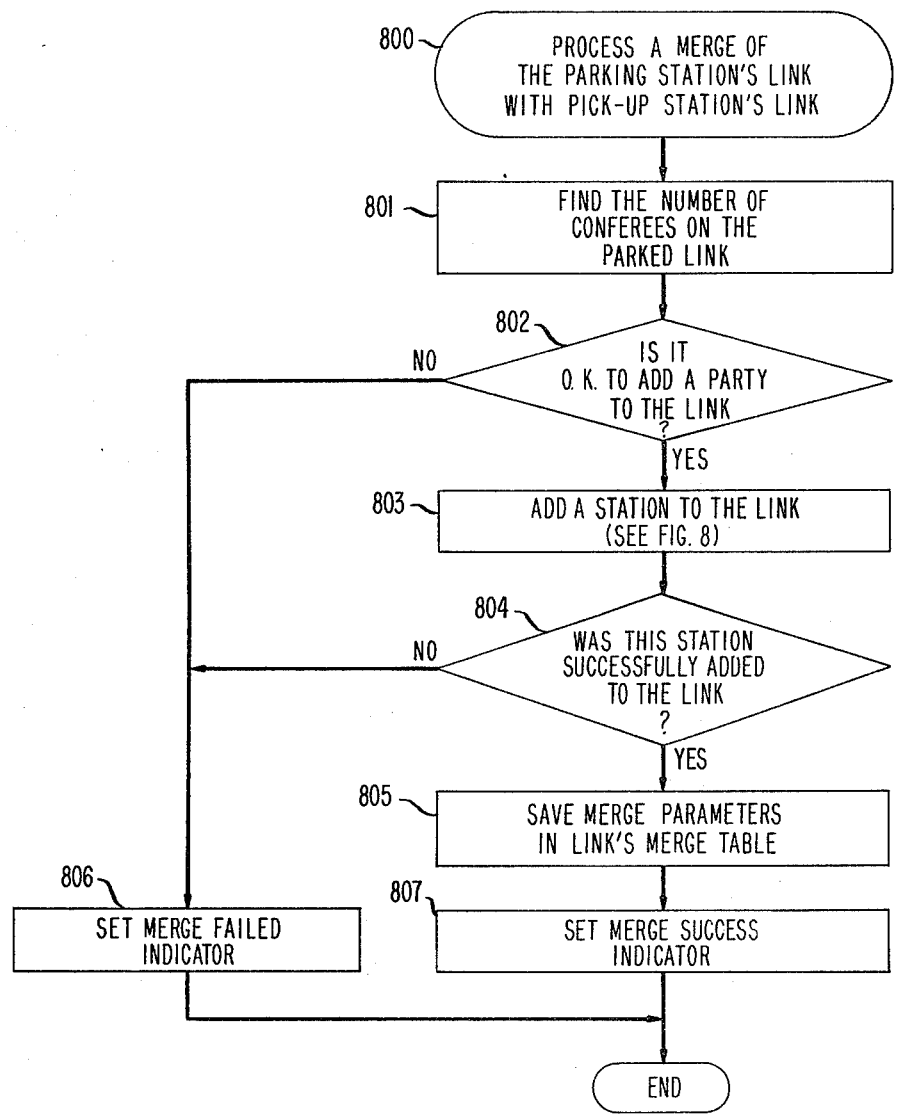
FIG. 8 shows the steps used to merge links during park pick-up.

The merge park software, FIG. 8, connects the park pick-up station and the parked call to a common link. Its tasks include: (1) validating the parking station's call park record, blocks 800–802, 806, and (2) merging the station's link with the parked link, blocks 803–807. The call park table, FIG. 4, blocks 401, 403, is structured so that a station's last held record and the corresponding call park record occupy consecutive locations in the table. By examining the station's call park record, the system can determine if this station previously parked a call. A station's park record indicates the call park state if the call park record contains a link pointer.

The station merging software connects the parked link and the pick-up station to a common link. Its tasks include: (1) validating the conferencing limit, blocks 801, (2) adding a station to the link record block 803 (FIG. 9), and (3) merging the two links into a common link, block 805.

The conferencing limit software, block 801, determines if all parties on the new link can be added to the parked link. It checks the link's conference count, previously stored and based on the number of parties found, it sets the accept or reject indicator. An additional party is accepted if the number of conferees is less than the maximum allowed and rejected if the number of conferees is equal to the maximum allowed.

Figure 9:
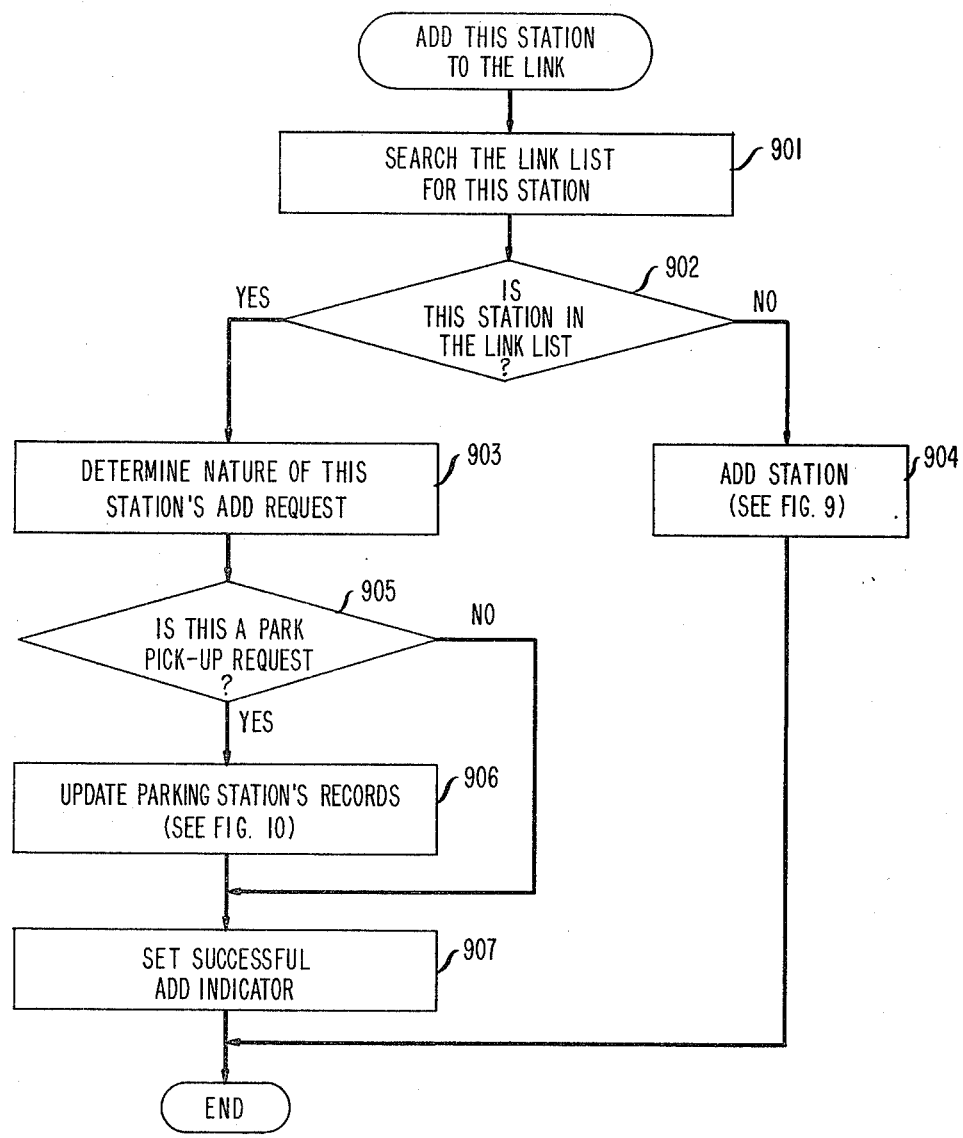
FIG. 9 shows the overall steps used when adding a station to a link during park pick-up.

The station-to-link software—FIG. 9 performs three tasks: (1) determines if the station is currently in the link list, blocks 901, 902, 903–907, (2) adds the new station to the link list, blocks 904 (FIG. 10), and (3) updates the station/link records, blocks 906 (FIG. 11).

The search link list software, block 901, determines if a specific facility is currently in the link list. This determination is important since links can support a limited number of facilities—i.e. stations, lines, tones, etc. Multiple appearances of the same facility on a link would diminish the link's conferencing capacity.

Figure 10:
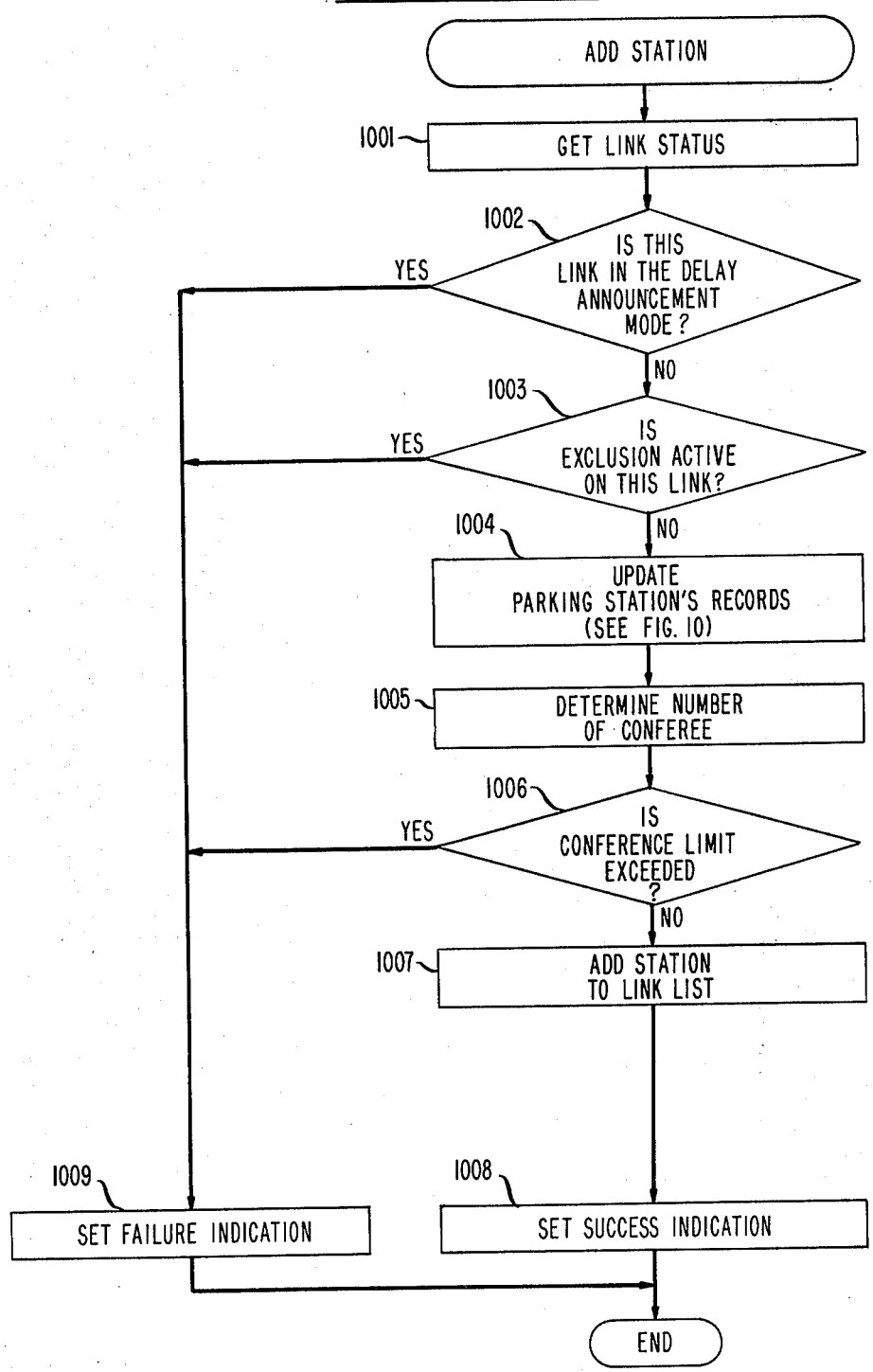
FIG. 10 shows the steps used during park pick-up to add a station to the link when the station does not have an appearance in the link list record.
Figure 11:
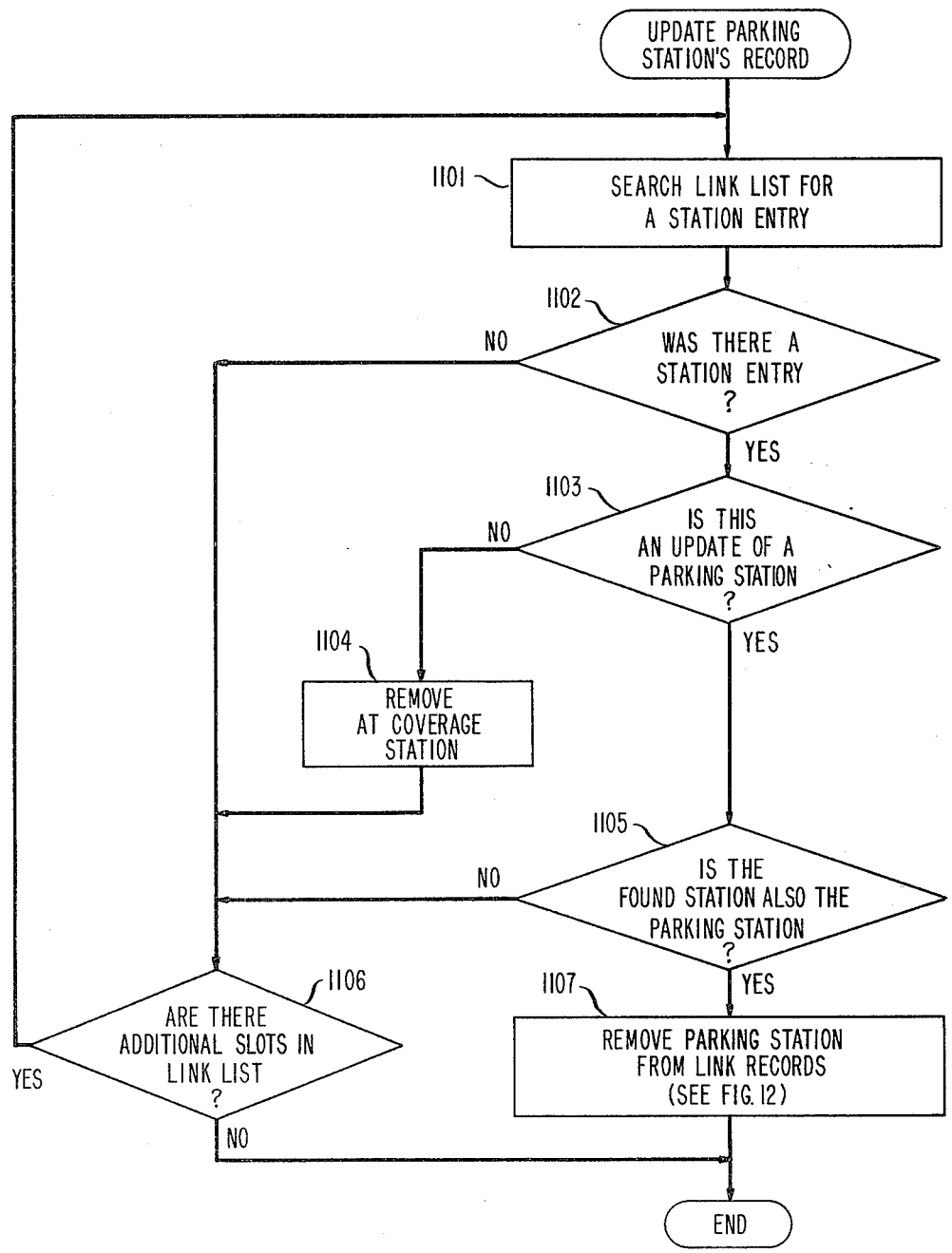
FIG. 11 is a flow chart depicting the steps used to update the parking station's record during a park pick-up sequence.
Figure 12:
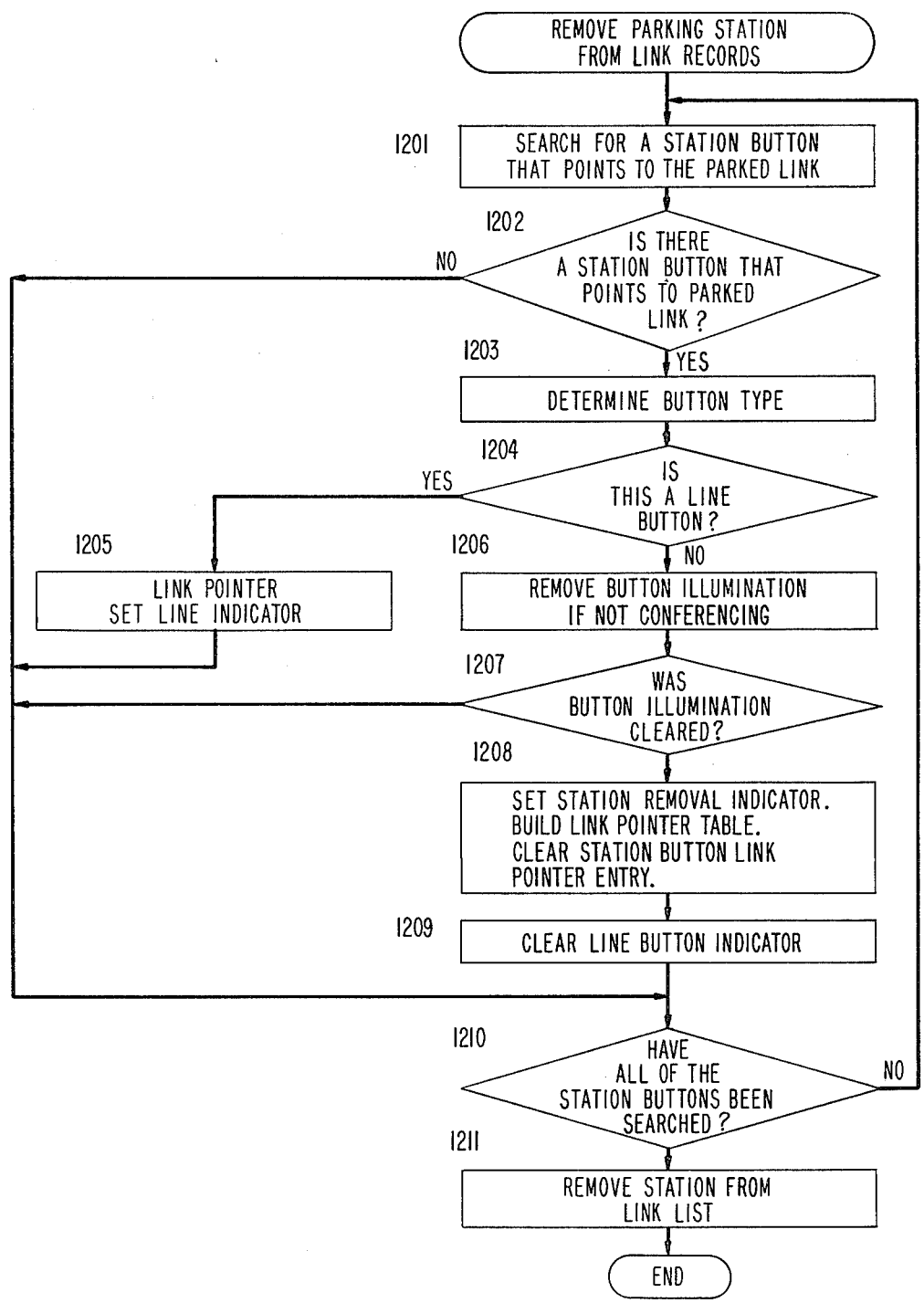
FIG. 12 is a flow chart which shows the steps used to remove the parking station from a link.

The add station software, block 904 expanded in FIG. 10, adds a station to a busy link by: (1) determining that an appropriate condition exists to add the station to the link, blocks 1001–1003, 1009, (2) updating station/link records, block 1004, and (3) adding a station to the link, block 1005–1008.

A valid condition exists for adding a facility to a link if: (1) exclusion is not active on the link, block 1003, and (2) the number of conferees is less than the maximum allowed, block 1006. The exclusion and conference limiting software determines the exclusion and conferencing status respectively of a link. Either condition, if invalid will prevent a station from being added to the link.

A station is added to a link by physically connecting it to the link and by placing the station's index in an available slot in the link list. Each time a facility is added, the number of conferees on the link must also be updated. This is accomplished by block 1007.

A parking station activates the conference transfer feature by not returning to the parked conference prior to the park pick-up request. In this situation, the pick-up station, when connected to the conference, will result in the parking station being removed from the conference link. If the parking station returns to the call prior to the dialing of the pick-up code, the pick-up station joins the conference without affecting the parking stations's state. It is the responsibility of the station updating software—FIG. 11 to discriminate between the two requests and update the station and link records accordingly. In order to identify the tasks, the removal routine in FIG. 12 performs several functions: (1) clearing the appropriate station records and (2) removing the required station from the link during park transfer.

Conclusion

While this invention is shown in conjunction with an electronic telephone system, it is to be understood that the same feature can be used with any type of telephone system, including electromechanical systems. It would also be possible to use the conferencing technique taught herein with a central office type conferencing system as well as with a customer premises system as shown.

The stations shown for illustrative purposes can, of course, be terminals for data or computer graphics and need not all be located at the same physical location, but may be distributed at remote locations. Also it should be understood that special services signals can include any type of signaling, including the use of a dedicated button or the use of a special digit preceding the normal dialing stream.

What is claimed is:

1. A conference control arrangement for use in a communication system, said control arrangement being operable for establishing a conference connection among at least three stations, said control arrangement characterized by means responsive to a signal from one of said stations involved in an established conference for placing said conference in a parkhold mode whereby said one station is removed from said conference while said conference continues between the other conference stations, means responsive to receipt of a second signal from said removed one station for directly reconnecting said one station to said established conference at the option of said one station, means for accepting from any station in the system an identification signal, and means responsive to receipt of said identification signal from any said signaling station for connecting said signaling station to said established conference.

2. The invention set forth in claim 1 further comprising means responsive to receipt of said identification signal from a specific signaling station prior to said one station rejoining said conference for connecting said specific station to the exclusion of said one station.

3. The invention set forth in claim 1 wherein said identification signal is the intercom number of said removed station preceded by a service character.

4. In a communication system the method of adding stations to an existing conference, said method including the steps of establishing a conference connection having a plurality of stations, accepting from one of said conferenced stations a signal for placing the established conference in a special hold state, removing said one station from said conference connection, assigning a specific identification dialing signal to said conference in said special hold state, accepting a second signal from said disconnected one station for reconnecting said one station to said established conference at the option of said one station, receiving dialing signals sent from nonconference stations, and adding to said conference in said special hold state a station sending said specific identification dialing signal.

5. The invention set forth in claim 4 wherein said specific identifications dialing signal is uniquely associated with a specific number assigned to said one station.

6. The method set forth in claim 4 wherein said assigning step includes the step of assigning a specific identification dialing signal to said conference for each said one station placing said conference in said special hold state.

7. A communication system having a plurality of links, each link available for the establishment thereon of communication connections, including conference connections, some of said connections established by dialing signals and some by special services signals coupled with said dialing signals, means responsive to a special services signal from one station on a conference associated with a first link for placing said conference in a parkhold mode on said link and for connecting said one station to a second link while reserving said one station's position on said first link and means responsive to receipt from a specific station of a dialing signal corresponding to the station identity of said one station coupled with a unique special services signal for connecting said specific station to whatever link said conference is assigned to.

8. The invention set forth in claim 7 wherein said last-mentioned means includes a processor having a status table of all links and all stations associated with said links, said table including a temporary listing of the current hold status of any said station and the parkhold status of said station, said parkhold status record including the link assigned to said conference.

9. The invention set forth in claim 7 wherein said placing means includes means for establishing a table of valid dialing signals and temporary link assignments for each station corresponding to said dialing signal, the link assignments being generated in response to said special services signal from said one station.

10. The invention set forth in claim 9 wherein said connecting means includes means for accepting said specific station dialing signal and for accessing said table of valid dialing signals to ascertain the link corresponding to said dialing signal.

* * * * *